Nov. 7, 1939.　　　　G. A. DELF　　　2,179,468
HEATING SYSTEM FOR CORN POPPING MACHINES

Filed Jan. 21, 1938

INVENTOR.
George A. Delf.
BY
ATTORNEYS

Patented Nov. 7, 1939

2,179,468

UNITED STATES PATENT OFFICE 2,179,468

HEATING SYSTEM FOR CORN POPPING MACHINES

George A. Delf, St. Louis, Mo., assignor, by mesne assignments, to Atlas Tool & Manufacturing Company, St. Louis, Mo., a corporation Application January 21, 1938, Serial No. 186,172

1 Claim. (Cl. 219—19)

This invention relates to corn popping machines and particularly to a novel heating system which forms a part of the machine and which controls the temperature of the popping oil therein so that a predetermined range of temperature is maintained during the time the machine is in operation.

One of the important aims of the incident invention is to provide corn popping machine with submerged resistance coils for heating the popping oil, which coils have an electric circuit provided with two separate switches one of which is closed and opened as the machine is manipulated to and from the operative position respectively—the other of said switches being opened and closed by a thermostat which is responsive to the fluctuation in the temperature of the popping oil above and below a predetermined range.

Another object of the invention is to provide a corn popping machine with a heating system that is electrical in nature and which is responsive both to movements incident to rendering a machine operative and inoperative and to the rise and fall of the temperature of the popping oil above and below a predetermined range that has been found to be most effective in the efficient popping of corn.

Other objects of the invention, including specific details of construction and the manner of combining the heating system with certain types of corn popping machines, will appear during the course of the following specification, referring to the accompanying drawing wherein is diagrammatically illustrated one embodiment of the invention.

Figure 1:
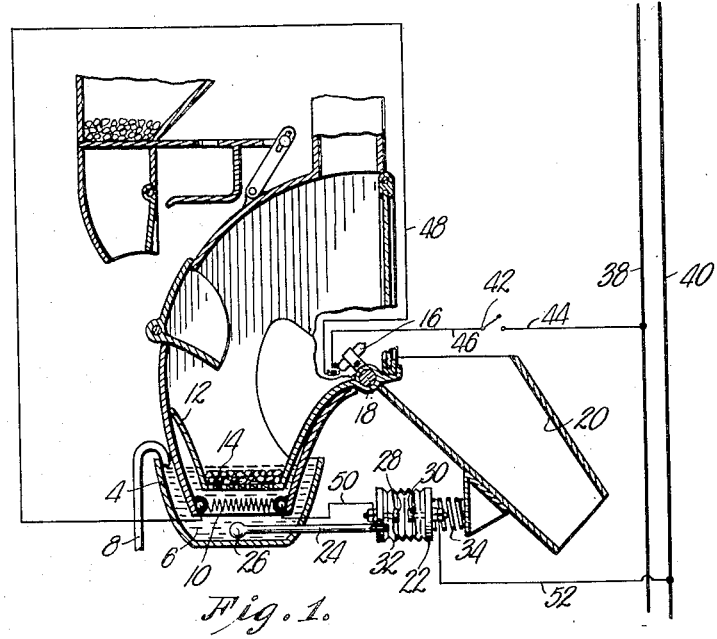
Figure 1 is a schematic view of a portion of a corn popping machine which has been equipped with a heating system in accordance with the present invention.

In the immediate past, a large amount of difficulty has been experienced by manufacturers and operators of corn popping machines because of the inability to control the temperature of the small volume of popping oil during the time the kernels of corn are submerged therein, as they are being popped.

One step forward in the art has been to completely submerge the unpopped kernels in a relatively small volume of oil and to maintain that small volume of oil at the proper level by injecting an additional amount of oil just before the charge of unpopped corn is dropped therein. The small volume of oil which submerges the charge of unpopped corn should be maintained within a range of from 390° F. to 400° F. This range may be altered slightly to meet physical conditions of the kernels of corn being popped, as regards their moisture content and toughness of hull.

If the temperature of the oil submerging the kernels of corn is raised above 400° F., there is danger of burning the corn and causing the oil to smoke and become an objectionable factor in the machine. Means is provided therefore, in the combination of parts contemplated by this invention, for opening and closing the circuit which supplies energy to the submerged heating coils after the main switch of that circuit has been closed and if the oil temperature drops below or exceeds the tolerance range, above mentioned or established, through the setting of the thermostat.

In the accompanying drawing the numeral 4 designates the relatively small container which holds popping oil 6. This oil is supplied to container 4 through tube 8 which leads from any suitable source. The oil level is maintained in container 4 by the use of tube 8 and an electric heating element 10 is supported in oil 6 below the normal operating level. This element 10 is of the well-known type that will heat oil 6 when current is passing therethrough and when container 12 is in the position shown in Fig. 1, the charge of unpopped corn is supported by the foraminous bottom 14 thereof. This charge of corn is completely submerged in oil 6 and is projected therefrom when the explosion incident to popping occurs.

A mercury or similar type switch 16 is associated with container 12 so that when said container is in the operative position, shown in Fig. 1, the circuit supplying current to coil 10 will be closed. This switch 16 is secured to shaft 18 in the instance shown, but may be associated with any of the parts of the corn popping machine, it being merely necessary that when container 12 is in the operative position and the charge of corn is dropped, that the circuit be closed to insure immediate popping. After the corn is popped, container 12 is tipped so as to dump the popped corn through delivery chute 20.

The bellows type thermostat has the tube 24 extended into reservoir 4 and a bulb 26 thereon is completely submerged in the oil 6.

Contacts 28 and 30 are moved toward and from each other as the fluid in tube 24 and bellows 32 is contracted and expanded respectively, by the fall and rise of temperature of oil 6. Light spring 34 is the only resistance which the pressure in bellows 32 need overcome, and since thermostats of this character are well-known in the art, further detailed description is deemed unnecessary.

Points 28 and 38 of thermostat 22 form another switch in the circuit which supplies current to the coil 10, and it is obvious that these two switches 16 and 22 must be closed before coils 10 are energized. When switch 16 is closed however, as is the case whenever the machine is manipulated to the operative position, contacts 28 and 30 may be opened and closed to govern the amount of current reaching coils 10 during the popping action, and since this thermostat is set so as to maintain the temperature range of substantially 10°, the desired temperature of from 390° F. to 400° F. is constantly assured.

Figure 2:
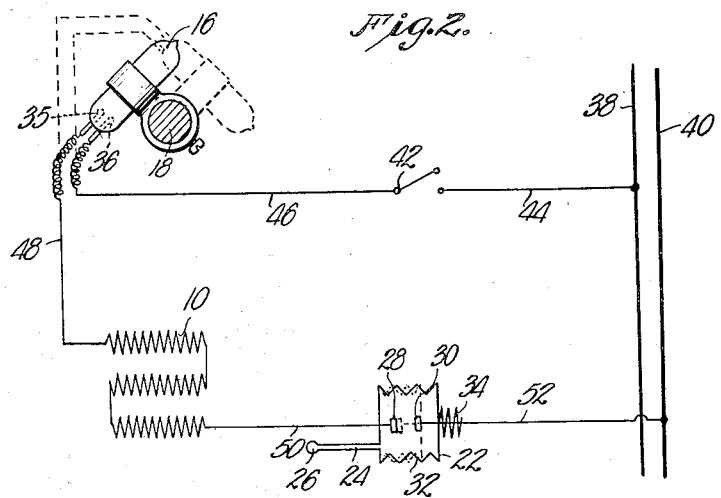
Fig. 2 is a wiring diagram illustrating the manner of associating the two switches in the circuit with the corn popping machine mechanism and with the specially located thermostat.

In the diagram of Fig. 2, points 35 and 36 of mercury switch 16, are bridged by the mercury when the switch is in the position shown in full lines. When the switch is in the position shown in dotted lines, the circuit is open. When it is desired to disconnect the machine from the main conduits 38 and 40, which extend from the source of electrical energy, a main switch 42 may be opened.

The operation and relation of the heating system to the parts of the well-known corn popping machine is obvious to one skilled in the art, and it will be understood that when switch 42 is closed and switch 16 is in the operative position (full lines of Fig. 1), that current will pass along wire 44, through switch 42, along wire 46, across bridged points 35 and 36, through wire 48, through resistance coils 10, through wire 50, through closed points 28 and 38, and thence through wire 52 to wire 40. When the parts are in this position, the flow of current is governed by the position of points 28 and 38, and so long as the temperature of the small amount of popping oil 6 in reservoir 4 is within the range mentioned herein, both switches will remain closed.

If the temperature of oil 6 drops below the predetermined point, such as 390° F., the condition of fluid in tube 24 and thermostat 22 will insure that points 28 and 30 will remain closed. If the temperature of oil 6 rises above the predetermined set maximum of 400° F., then points 28 and 30 will separate to open the circuit.

With such a small volume of oil 6 as is set out in reservoir 4, it is common for the temperature of oil 6 to be raised to 400° F. very shortly after switch 16 has been closed and after the charge of corn has been dropped into container 12. If the circuit was allowed to remain closed, the corn would likely be burned and the oil would smoke and approach dangerously close to the flash point. The auxiliary thermostatic switch however, which is controlled by the temperature of the oil, opens the circuit and insures that the coils will not be further heated unless the oil 6 drops below a temperature where additional heat is needed.

Not only does such a system insure economy as regards the consumption of current, but insures that the temperature of oil 6 is precisely correct to act upon the unpopped kernels and to produce the largest possible popped grains from a given quality of corn.

The illustrations indicating one manner of embodying the invention in a corn popping machine, are diagrammatic, and it is understood that changes and modifications might be made without departing from the spirit of the invention.

Having thus described the invention, what is claimed as new and desired to be secured by Letters Patent is:

In a corn popping machine having a reservoir provided with a filling of popping oil, a container for the corn to be popped pivotally mounted for movement to and from a position where a portion thereof is below the level of said oil, and an electrical heating element submerged within the oil below said container, the combination of a heating element circuit; a mercury switch mounted for bodily oscillating movement with said container, said switch having contact points adapted to be closed when the mercury switch is at one end of its path of travel and to be opened when at the other end of its path of travel; a thermostat having a portion thereof within the said oil; and a second switch operable by the thermostat when the portion of the thermostat within the oil responds to a change of temperature of the oil, said first mentioned switch being effective to open and close the said circuit only when the second switch is closed, said second switch being effective to open and close the said heating element circuit only when the first mentioned switch is closed.

GEORGE A. DELF.